US007982672B2

(12) United States Patent
Fuimoto

(10) Patent No.: US 7,982,672 B2
(45) Date of Patent: Jul. 19, 2011

(54) RECEPTION DEVICE

(75) Inventor: Masato Fuimoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 12/700,816

(22) Filed: Feb. 5, 2010

(65) Prior Publication Data
US 2010/0201576 A1 Aug. 12, 2010

(30) Foreign Application Priority Data

Feb. 12, 2009 (JP) ................................ 2009-029354

(51) Int. Cl.
G01S 5/10 (2006.01)
(52) U.S. Cl. ........ 342/437; 342/445; 342/451; 342/464; 455/272
(58) Field of Classification Search .................. 342/417, 342/422–424, 432, 437, 445, 450–452, 463, 342/464; 455/269, 272; G01S 3/02, 5/04, G01S 5/10
See application file for complete search history.

(56) References Cited

U.S. PATENT DOCUMENTS 4,939,522 A 7/1990 Newstead et al.
5,689,270 A * 11/1997 Kelley et al. ............. 342/357.31
6,492,945 B2 * 12/2002 Counselman et al. ........ 342/464
2003/0030568 A1 * 2/2003 Lastinger et al. ........ 340/825.49
2005/0035906 A1 2/2005 Krause et al.
2005/0264700 A1 * 12/2005 Matsuo ........................ 348/570

FOREIGN PATENT DOCUMENTS

JP 2005-323247 A 11/2005

* cited by examiner

Primary Examiner — Thomas H Tarcza
Assistant Examiner — John B Vigushin
(74) Attorney, Agent, or Firm — Global IP Counselors

(57) ABSTRACT

A reception device includes a receiver, a direction detector, a location information acquisition component and a location calculator. The receiver receives broadcast signals sent from transmission towers, respectively. The direction detector detects reception directions of the broadcast signals. The location information acquisition component acquires location information indicating locations where the transmission towers are installed, respectively. The location calculator selects at least three of the transmission towers, estimate at least two estimated areas in which the reception device is located with each of the at least two of the estimated areas being estimated based on the reception directions of the broadcast signals of two of the at least three of the transmission towers and the location information of the two of the at least three of the transmission towers, and calculate a location of the reception device based on the at least two of the estimated areas.

13 Claims, 9 Drawing Sheets

| ZONE INFORMATION | LOCATION INFORMATION |
|---|---|
| ZONE A | SECTOR BOUNDED BY APEXES (0, 5), (0, 8), (3, 8), AND (3, 5) |
| ZONE B | SECTOR BOUNDED BY APEXES (4, 3), (4, 8), (9, 8), AND (9, 3) |
| ... | ... |
| ZONE n | SECTOR BOUNDED BY APEXES (H, H), (H, J), (J, I), AND (J, H) |

RECEPTION DEVICE

CROSS-REFERENCE TO RELATED APPLICATIONS

This application claims priority to Japanese Patent Application No. 2009-029354 filed on Feb. 12, 2009. The entire disclosure of Japanese Patent Application No. 2009-029354 is hereby incorporated herein by reference.

BACKGROUND

1. Field of the Invention

The present invention generally relates to a reception device. More specifically, the present invention is relates to a reception device that receives broadcast signals sent from transmission towers.

2. Background Information

A conventional reception device receives broadcast signals such as digital broadcast signals (see Japanese Laid-Open Patent Application Publication No. 2005-323247, for example). With the conventional reception device, a reception direction of a multidirectional antenna is determined for each of broadcast signals transmitted from transmission towers that broadcast signals to a region in which the reception device is installed.

With the conventional reception device, region information indicating the region corresponding to a place where the reception device is installed is inputted by the user of the reception device. Information associated with channels on which the broadcast signals have been transmitted, etc., is stored for each transmission tower. The information is used to identify the transmission towers that transmit the received broadcast signals.

However, with the conventional reception device, the user needs to input the region information. Consequently, the region information has to be inputted at an initial setup of the reception device, or whenever there is a change in the installation region of the reception device, such as when the user moved. As a result, this could be troublesome for the user.

SUMMARY

The present invention was conceived in light of the above-mentioned problems. One object of the present invention is to provide a reception device with which a location of the reception device can be calculated without causing the user much trouble.

In accordance with one aspect of the present invention, a reception device includes a receiver, a direction detector, a location information acquisition component and a location calculator. The receiver is configured to receive a plurality of broadcast signals sent from a plurality of transmission towers, respectively. The direction detector is configured to detect reception directions of the broadcast signals that are received by the receiver. The location information acquisition component is configured to acquire location information indicating locations where the transmission towers are installed, respectively. The location calculator is configured to select at least three of the transmission towers, estimate at least two estimated areas in which the reception device is located with each of the at least two of the estimated areas being estimated based on the reception directions of the broadcast signals of two of the at least three of the transmission towers and the location information of the two of the at least three of the transmission towers, and calculate a location of the reception device based on the at least two of the estimated areas.

With this reception device, it is possible to provide a reception device with which a location of the reception device can be calculated without causing the user much trouble.

BRIEF DESCRIPTION OF THE DRAWINGS

Referring now to the attached drawings which form a part of this original disclosure:

FIG. 3 is a zone table stored in the reception device illustrated in FIG. 2;

DETAILED DESCRIPTION OF EMBODIMENTS

A preferred embodiment will now be explained with reference to the drawings. It will be apparent to those skilled in the art from this disclosure that the following descriptions of the preferred embodiment are provided for illustration only and not for the purpose of limiting the invention as defined by the appended claims and their equivalents.

Figure 1:
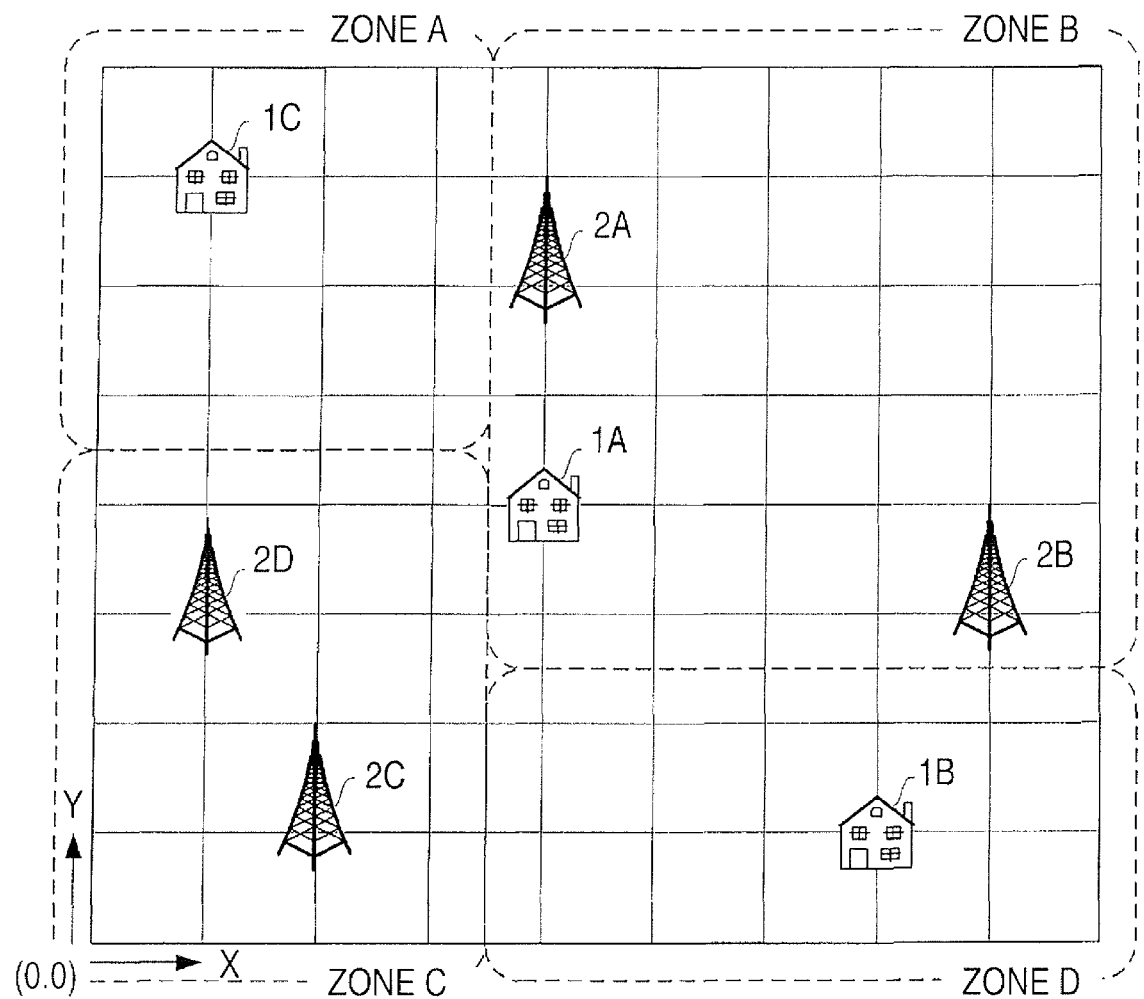
FIG. 1 is a diagram illustrating installation locations of reception devices and transmission towers.

Reception devices 1A, 1B and 1C will now be described through reference to FIGS. 1 to 4. First, the relation between the installation locations (e.g., locations) of the reception devices 1A, 1B and 1C and the transmission towers 2A, 2B, 2C and 2D will be described through reference to FIG. 1. FIG. 1 shows the relation between the installation locations of the reception devices 1A, 1B and 1C and transmission towers 2A, 2B, 2C and 2D.

As shown in FIG. 1, the reception device 1A, the reception device 1B, and the reception device 1C are installed in a zone B, a zone D, and a zone A, respectively. In the following description, when no specific distinction is made between the reception device 1A, the reception device 113, and the reception device 1C, this will be referred to as the reception device 1 or the reception devices 1. The zones A, 13, C and D are provided in sector units that each have 10,000 square meters, or are provided in zone units such as "Osaka-shi, Chuo-ku, Honmachi," "Nihonbashi," or the like, for example.

The transmission tower 2A, the transmission tower 2B, the transmission tower 2C and the transmission tower 2D are installed in the zone B, and the zone C, respectively. Each of the transmission towers 2A, 2B, 2C and 2D transmits digital broadcast signals. In the following description, when no specific distinction is made between the transmission tower 2A, the transmission tower 2B, the transmission tower 2C and the transmission tower 2D, this will be referred to as the transmission tower 2 or the transmission towers 2. Also, the digital broadcast signals can be those that include zone information, such as a commercial for zone A, a commercial for zone B, and a commercial for zone C, for example, or those that do not include zone information, such as with drama and variety programs, for example. The reception device 1 receives the digital broadcast signals transmitted from three or more transmission towers 2, and then the reception device 1 calculates the location of the reception device 1.

The reception device 1 receives the digital broadcast signals transmitted from three or more transmission towers 2, and for each transmission tower 2 acquires the installation location and detects the reception direction of the digital broadcast signal. The reception device 1 has a function of calculating and acquiring the location of the reception device 1 base on the installation location of each transmission tower 2 and the reception direction of the digital broadcast signal. The reception device 1 uses this function to identify a zone based on the location of the reception device 1. This function will be described in detail below.

Also, if the zone information is superimposed with (or multiplexed with) the digital broadcast signal received from the transmission tower 2, then the reception device 1 outputs this zone information if it indicates the zone in which the reception device 1 is installed, but does not output it if it indicates another zone. If no zone information is superimposed with the digital broadcast signal, then the reception device 1 outputs the digital broadcast signal.

Figure 2:
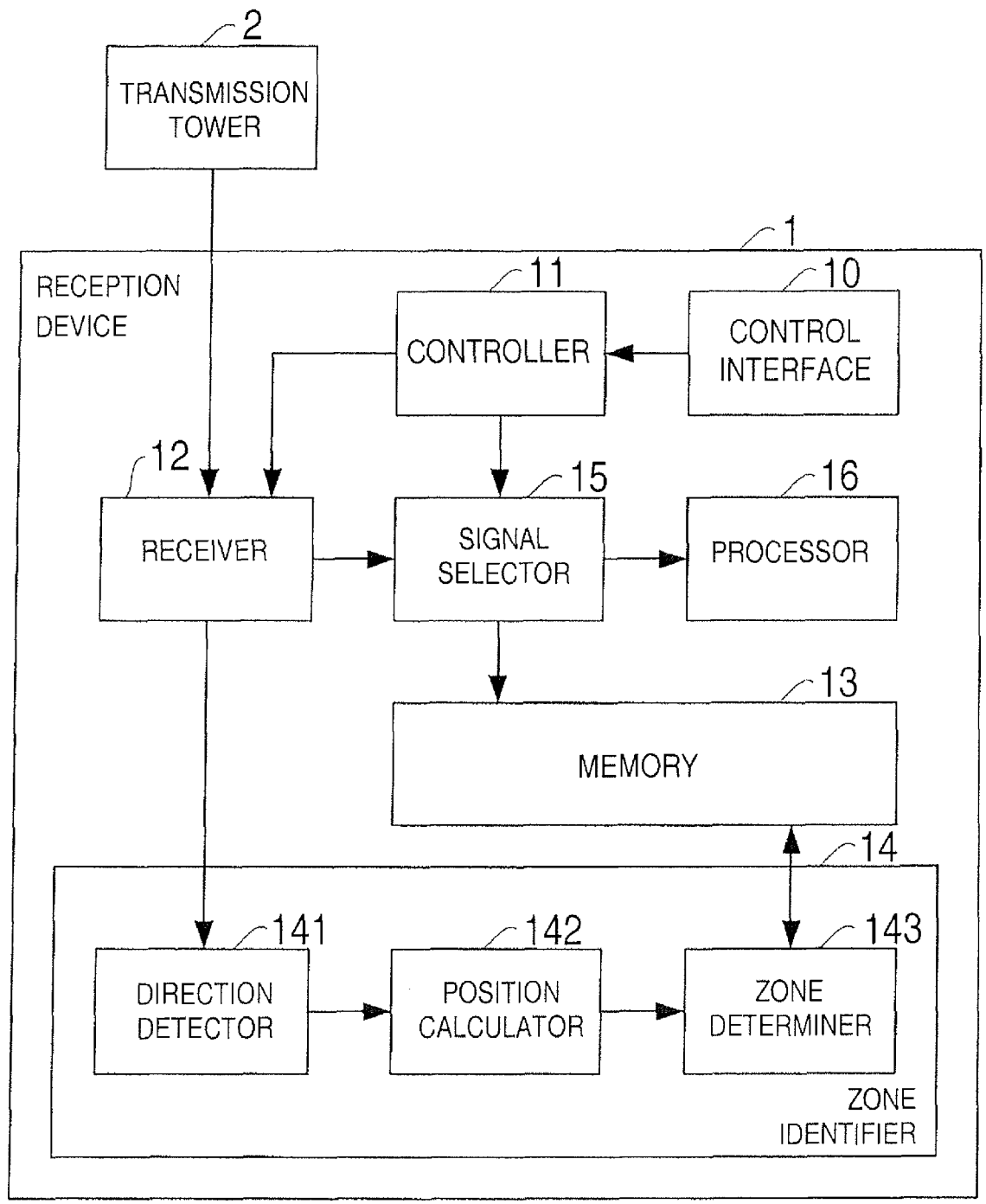
FIG. 2 is a block diagram illustrating a reception device.

Next, the function and constitution of the reception device 1 will be described through reference to FIGS. 2 and 3. The reception devices 1A to 1C all have the same functional constitution. FIG. 2 is a block diagram of the function and constitution of the reception device 1. FIG. 3 is an example of a zone table stored in the reception device 1. As shown in FIG. 2, the reception device 1 includes a control interface 10, a controller 11, a receiver 12, a memory 13, a zone identifier 14, a signal selector 15, and a processor 16.

The control interface 10 receives operational input from the user, and outputs operation signals based on this operational input to the controller 11. For example, the control interface 10 handles the setting of installation sites, the tuning of channels, and other such operational inputs from the user.

The controller 11 controls the receiver 12 and the signal selector 15 base on the operation signals from the control interface 10. When an operation signal directing the setting of the installation site is inputted, the controller 11 controls the receiver 12 so that a digital broadcast signal will be outputted to the zone identifier 14. When an operation signal directing the tuning of a channel is inputted, the controller 11 controls the receiver 12 so that a digital broadcast signal is outputted to the signal selector 15, and controls the signal selector 15 so that the outputted signal is selected from the digital broadcast signal.

Location information indicating the installation location of each transmission tower 2 is superimposed with the digital broadcast signal transmitted from that transmission tower 2. Also, zone information can be superimposed with the digital broadcast signal (such as a commercial) transmitted from the transmission tower 2.

A smart antenna having a plurality of radial elements is connected to the receiver 12. The receiver 12 receives the digital broadcast signals from the transmission towers 2 with this smart antenna. Here, the smart antenna receives the digital broadcast signal transmitted from each transmission tower 2 with each radial element and outputs it to the receiver 12. The receiver 12 outputs the received digital broadcast signal to the zone identifier 14 or the signal selector 15 base on a directive from the controller 11.

The memory 13 stores the zone table shown in FIG. 3. This zone table is a table in which the respective sectors are stored associated with each zone. More specifically, for example, as shown in FIG. 1, zone A is associated with the sector bounded by the apexes (0, 5), (0, 8), (3, 8), and (3, 5). Also, the zone table is referenced by a zone determiner 143 in determining the zone corresponding to the installation location of the reception device 1.

The zone identifier 14 includes a direction detector (e.g., direction detector and location information acquisition component) 141, a location calculator 142, and the zone determiner 143, and is a functional component that identifies the zone in which the reception device 1 is installed. The digital broadcast signal inputted to the zone identifier 14 is outputted to the direction detector 141.

The direction detector 141 acquires the location information for the transmission tower 2 that has transmitted the digital broadcast signal, from the digital broadcast signal inputted from the receiver 12. As discussed above, the location information for the transmission tower 2 is superimposed with the digital broadcast signal. Therefore, the direction detector 141 acquires location information for the transmission tower 2 by decoding the digital broadcast signal.

Also, the direction detector 141 compares the reception strength for each of the radial elements of the smart antenna, and detects the orientation of the radial element with the highest reception strength as the reception direction of the digital broadcast signal. For example, of the plurality of radial elements that have received the digital broadcast signal from the transmission tower 2A, the direction detector 141 detects the reception direction of the radial element that has received the digital broadcast signal at the highest signal level as the reception direction of the digital broadcast signal of the transmission tower 2A. The direction detector 141 also detects the reception direction for each transmission tower 2 (e.g., transmission towers 2A, 2B, 2C and 2D). The direction detector 141 then outputs the reception direction and the location information of the transmission tower 2 to the location calculator 142.

The direction detector 141 outputs the reception direction and the location information of the transmission tower 2 to the location calculator 142 for three or more transmission towers 2.

The location calculator 142 collectively calculates the location of the reception device 1 base on the reception direction and the location information of the transmission tower 2 inputted for three or more transmission towers 2, and outputs the installation location of the reception device 1 to the zone determiner 143. How the location of the reception device 1 is calculated will be described in detail below.

The zone determiner 143 acquires the zone corresponding to the calculated location of the reception device 1 from the zone table stored in the memory 13. The zone determiner 143 then stores the acquired zone in the memory 13.

The signal selector 15 selects a digital broadcast signal corresponding to the tuned channel from the digital broadcast signals inputted from the receiver 12 base on a directive from the controller 11.

The processor 16 decodes the digital broadcast signal and acquires a video signal and audio signal. Here, if the zone information is superimposed with the digital broadcast signal, then the processor 16 acquires the video signal and audio signal corresponding to the zone stored in the memory out of the superimposed zone information. The processor 16 then converts the video signal and audio signal from digital to analog format, and outputs each on a monitor (not shown) and speaker (not shown), respectively.

Next, how the reception device 1 calculates the location of the reception device 1 will be described through reference to FIGS. 4 to 9. This will be described using the reception device 1A shown in FIG. 1 as an example.

As shown in FIGS. 6-9, the reception device 1A receives the digital broadcast signals from three or more transmission towers 2, and produces from these transmission towers 2 two or more combination patterns each having two transmission towers (e.g., a plurality of pairs of transmission towers 2). The installation area (e.g., estimated area) of the reception device 1 is then estimated for each combination pattern. For example, the reception device 1A estimates the installation area E1 of the reception device 1A based on the transmission tower 2A and the transmission tower 2B (i.e., based on the digital broadcast signals from the transmission tower 2A and the transmission tower 2B), and estimates the installation area E2 of the reception device 1A based on the transmission tower 2C and the transmission tower 2D (i.e., based on the digital broadcast signals from the transmission tower 2C and the transmission tower 2D). Here, in the different combination patterns, both of the transmission towers 2 are different (e.g., one combination pattern includes the transmission towers 2A and 213, and the other combination pattern includes the transmission towers 2C and 2D). However, in the different combination patterns, there can be two of the same transmission tower. In other words, the different combination patterns can include the same transmission tower (e.g., one combination pattern includes the transmission towers 2A and 2B, and the other combination pattern includes the transmission towers 2A and 2C). Also, there can be two or more estimated installation areas. Then, the reception device 1A collectively calculates the location of the reception device 1A according to the positional relation between the estimated installation area E1 and installation area E2.

Figure 4:
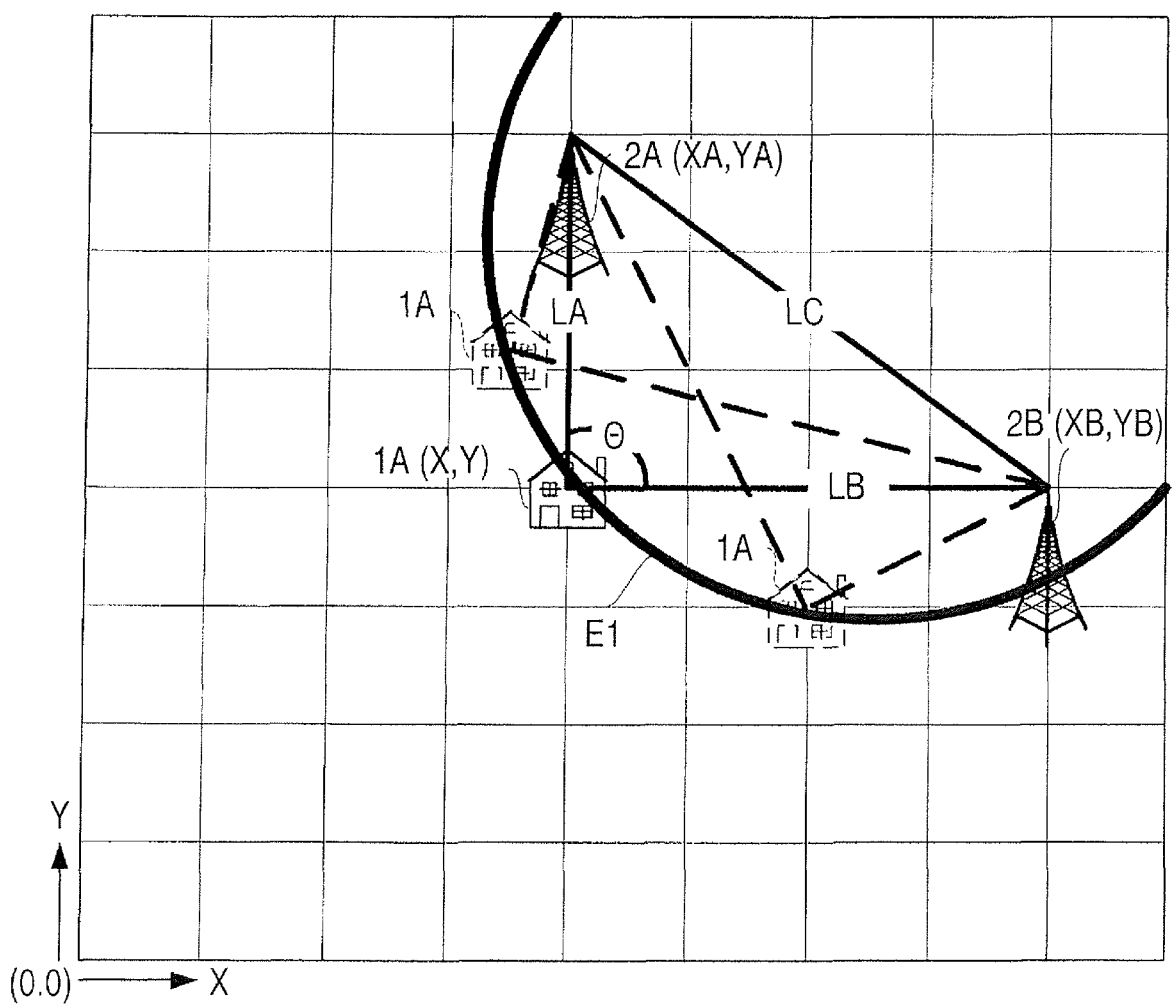
FIG. 4 is a diagram illustrating how installation areas of the reception device are estimated base on two transmission towers.
Figure 5:
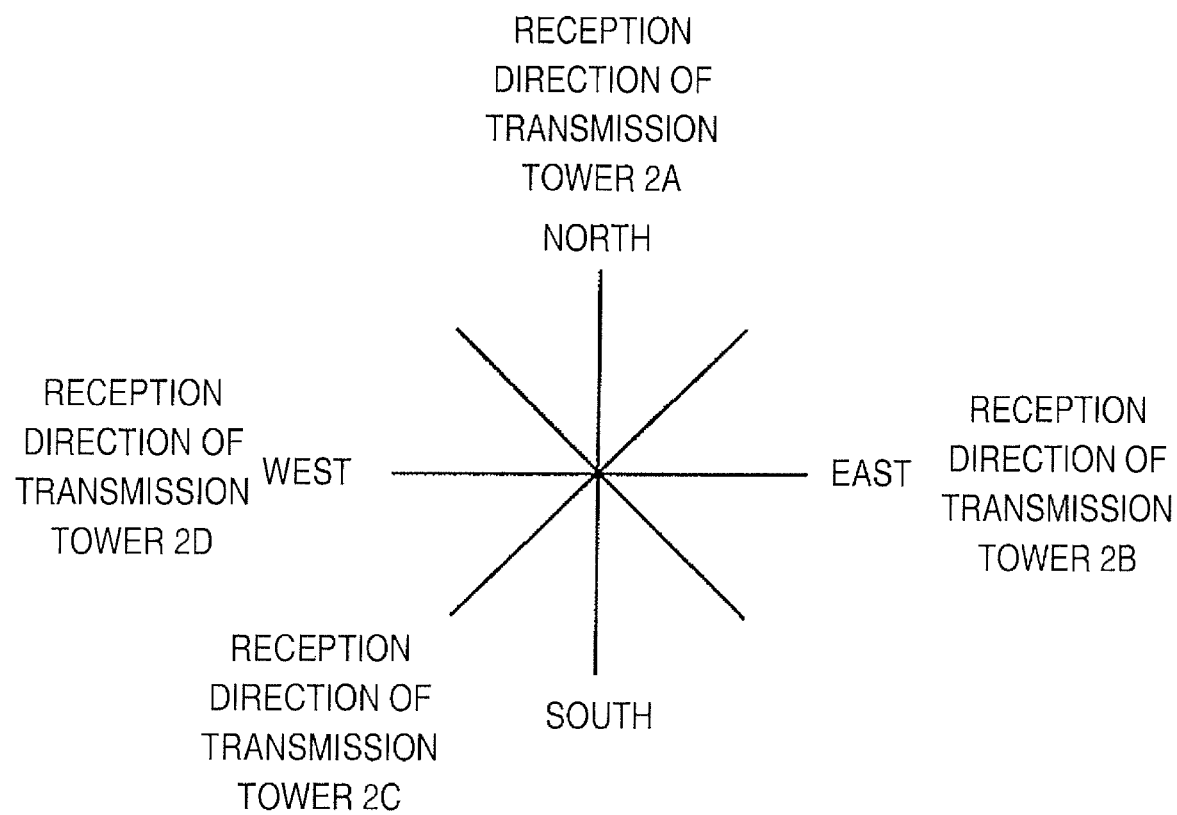
FIG. 5 is a diagram illustrating orientation of the transmission towers to the reception device.

Next, the method for estimating the installation area of the reception device 1 based on two transmission towers 2 will be described through reference to FIGS. 4 and 5. The reception device 1A is described below by using as an example the method for estimating the installation area E1 of the reception device 1A based on the transmission tower 2A and the transmission tower 2B. FIG. 4 is a diagram illustrating how the installation area of the reception devices 1 is estimated base on two transmission towers 2. FIG. 5 is a diagram of the orientation of the transmission towers 2 to the reception device 1.

As shown in FIG. 4, the reception device 1A, the transmission tower 2A, and the transmission tower 2B are linked by a triangle whose apexes are the installation locations of each, which creates a cosine theorem (i.e., law of cosines). We will let LA be the distance between the reception device 1A and the transmission tower 2A, LB the distance between the reception device 1A and the transmission tower 2B, and LC the distance between the transmission tower 2A and the transmission tower 2B. If we let θ be the angle formed by the reception direction of the digital broadcast signal from the transmission tower 2A and the reception direction of the digital broadcast signal from the transmission tower 2B with the reception device 1A, we obtain the following relational formula (Formula 1).

$$LC^2 = LA^2 + LB^2 - 2LALB \cos \theta$$ (Formula 1)

The reception device 1A acquires the location information indicating the installation locations of the transmission tower 2A and the transmission tower 2B with the direction detector 141. Herein, we will let (XA, YA) be the installation location of the transmission tower 2A, and (XB, YB) the installation location of the transmission tower 2B. If we let (X, Y) be the installation location of the reception device 1A, we obtain the following relational formulas (Formulas 2 to 4).

$$LC = \sqrt{((XA-XB)^2 + (YA-YB)^2)}$$ (Formula 2)

$$LA = \sqrt{((X-XA)^2 + (Y-YA)^2)}$$ (Formula 3)

$$LB = \sqrt{((X-XB)^2 + (Y-YB)^2)}$$ (Formula 4)

The reception device 1A also detects the reception directions of the digital broadcast signals from the transmission tower 2A and the transmission tower 2B with the direction detector 141. In the example shown in FIG. 5, the reception device 1A receives the digital broadcast signal transmitted by the transmission tower 2A from the north, and receives the digital broadcast signal transmitted by the transmission tower 2B from the east. As a result, θ can be expressed by the following formula (Formula 5).

$$\theta = 90 \text{ degrees}$$ (Formula 5)

The installation location (X, Y) of the reception device 1A can be calculated from Formulas 1 to 5 as above. However, the reception direction of the digital broadcast signal and the direction of the installation location of the transmission tower 2 that has transmitted the digital broadcast signal as seen from the reception device 1A is not always coincide. In view of this, the reception device 1A estimates the installation area E1 with a width of about 1 km, for example, using the line segment that satisfies Formulas 1 to 5 as the center line. In other words, the installation area E1 is estimated as a belt-like curved area with the width of about 1 km, and the width center line of the belt-like installation area E1 satisfies Formulas 1 to 5. Furthermore, the reception device 1A estimates the installation area E2 in the same manner as the installation area E1 based on the digital broadcast signals from the transmission tower 2C and the transmission tower 2D. Here, if the different combination patterns include the same transmission tower (e.g., one combination pattern includes the transmission towers 2A and 2B, and the other combination pattern includes the transmission towers 2A and 2C), then the reception device 1A can also estimate the installation area E2 in the same manner as the installation area E1 based on the digital broadcast signals from the transmission tower 2A and the transmission tower 2C, for example.

Figure 6:
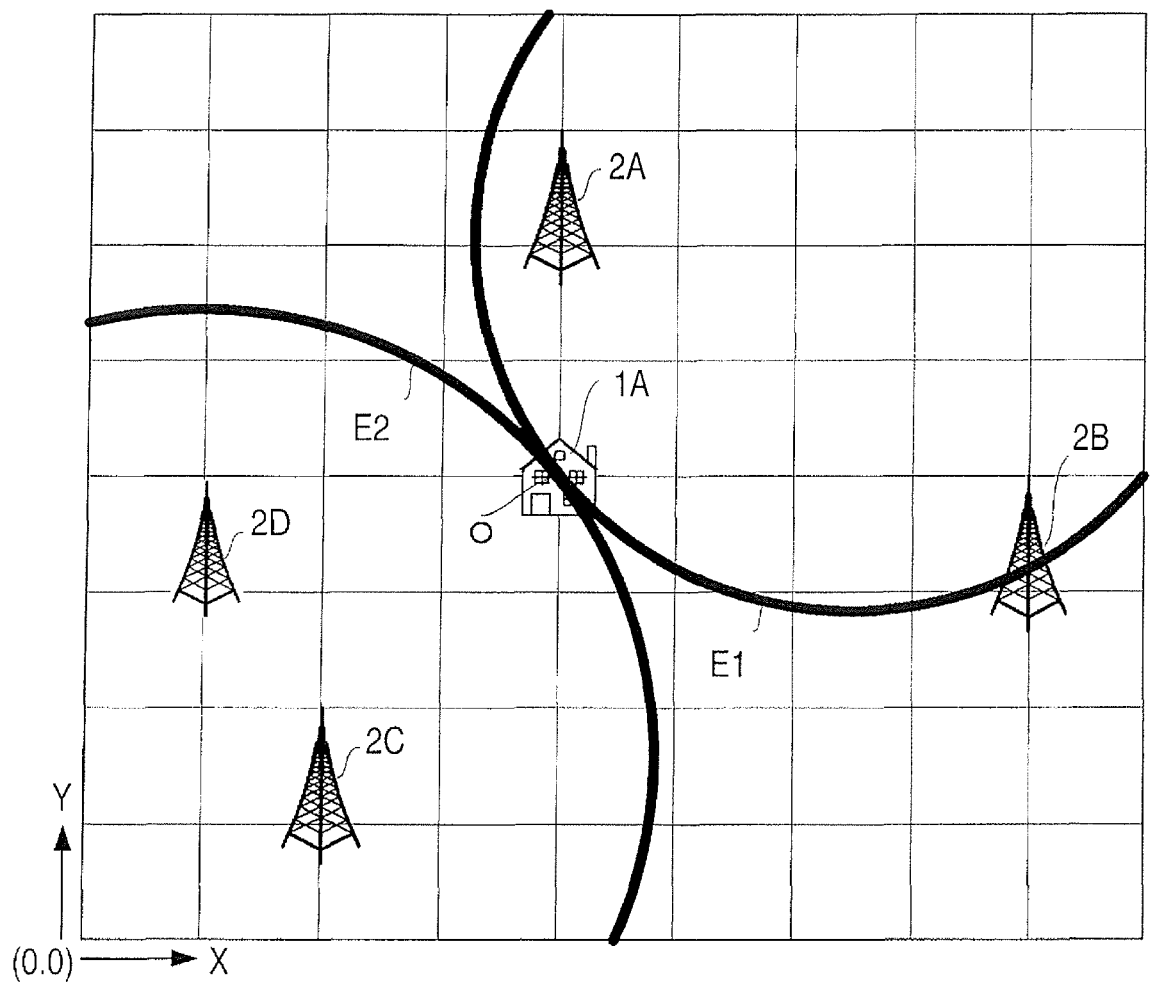
FIG. 6 is a diagram illustrating the installation location of the reception device when an intersection is at one point.
Figure 7:
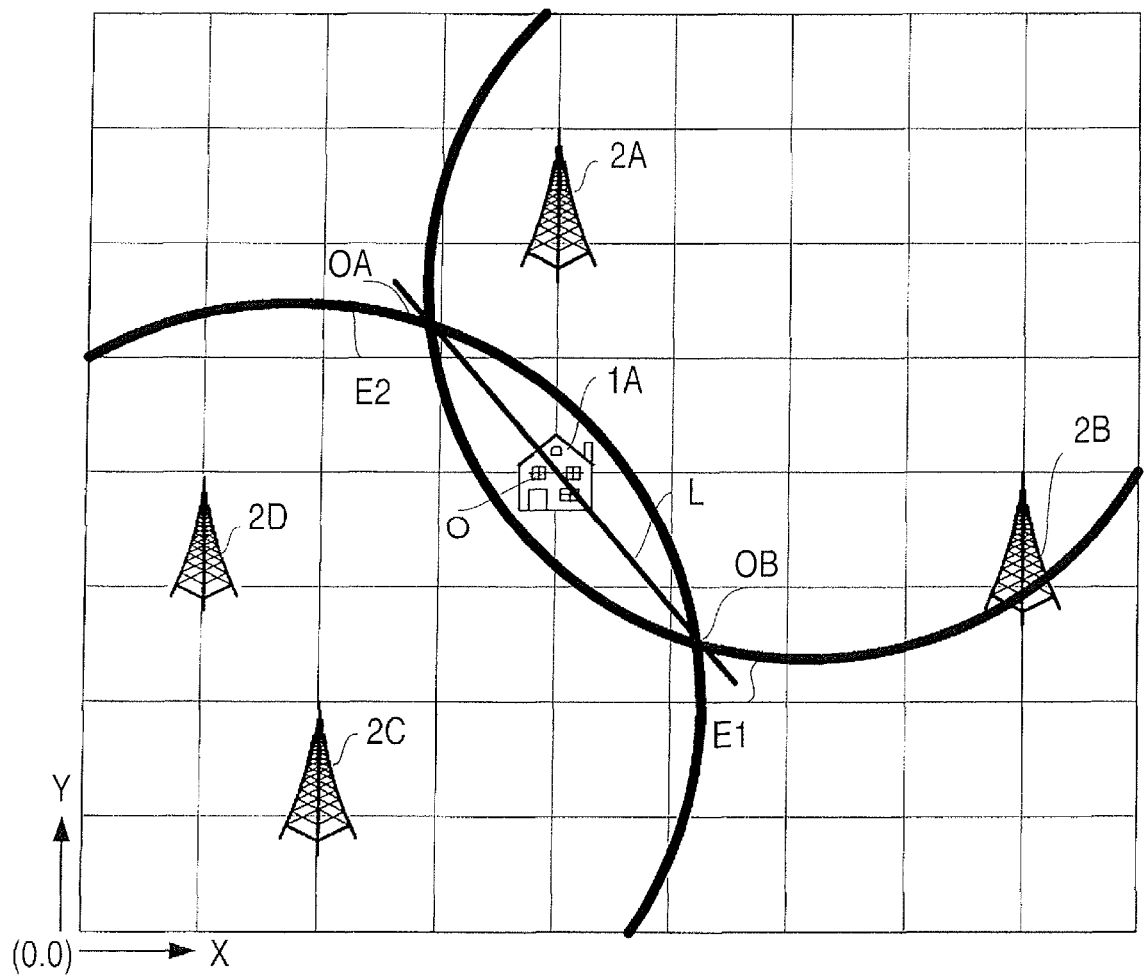
FIG. 7 is a diagram illustrating the installation location of the reception device when the intersection is at two points.
Figure 8:
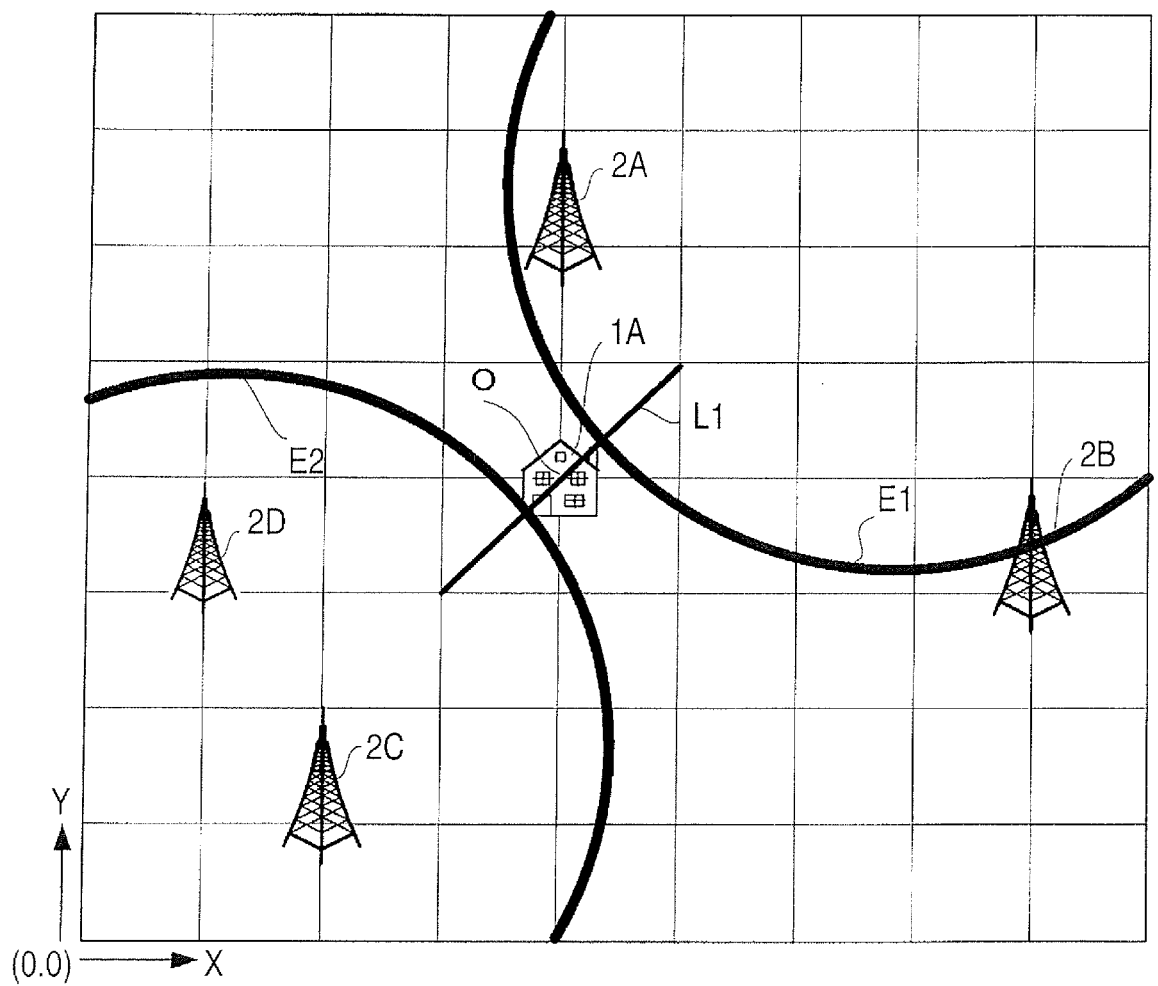
FIG. 8 is a diagram illustrating the installation location of the reception device when there is no intersection.
Figure 9:
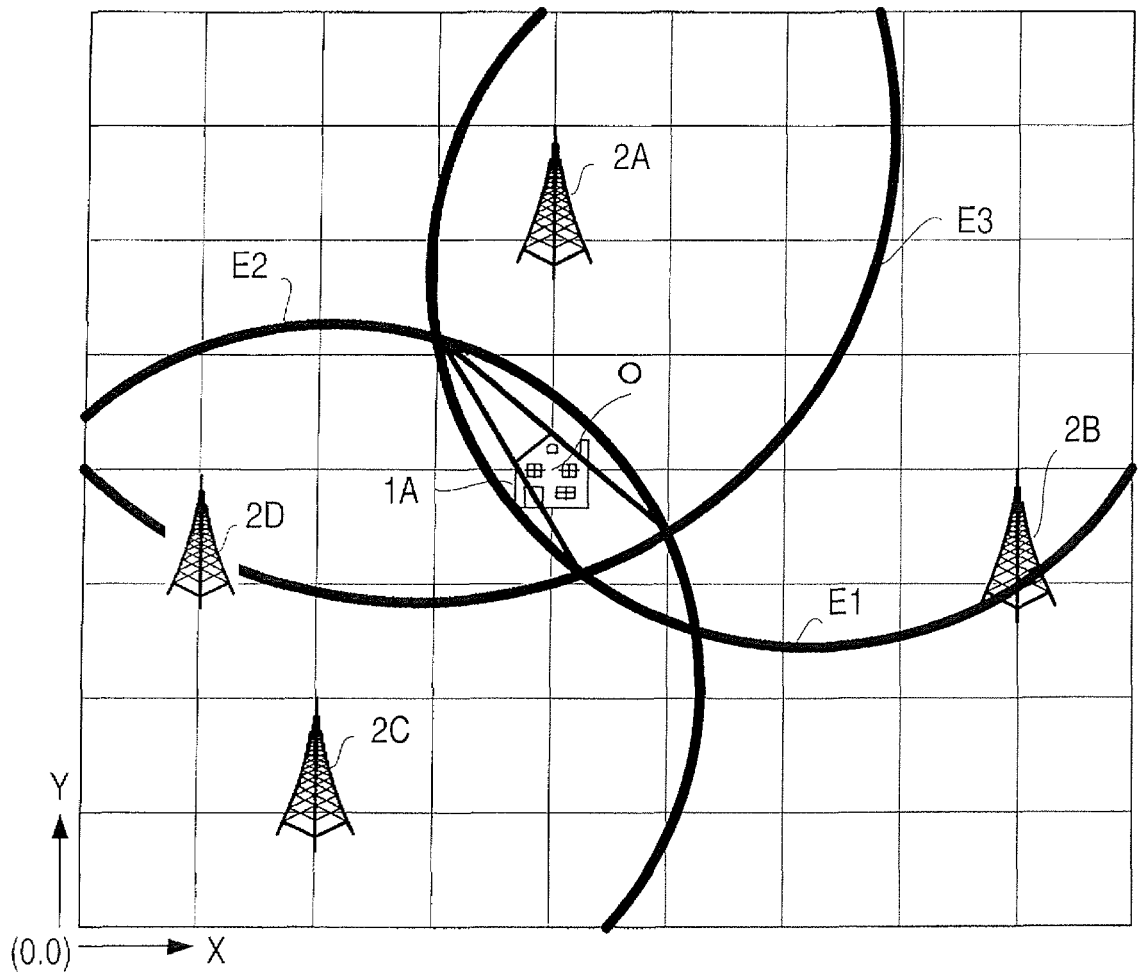
FIG. 9 is a diagram illustrating the installation location of the reception device when the intersection is at three or more points.

Next, the method for collectively calculating the installation location of the reception device 1 according to the positional relation of the estimated installation areas E1 and E2 will be described through reference to FIGS. 6 to 9. FIG. 6 is a diagram illustrating the installation location of the reception device 1 when the intersection of the estimated installation areas E1 and E2 is at one point (e.g., when the intersection of the estimated installation areas E1 and E2 includes one overlapping area). FIG. 7 is a diagram illustrating the installation location of the reception device 1 when the intersection is at two points (e.g., two overlapping area). FIG. 8 is a diagram illustrating the installation location of the reception device 1 when there is no intersection. FIG. 9 is a diagram illustrating the installation location of the reception device 1 when the intersection is at three or more points (e.g., three or more overlapping area).

As shown in FIG. 6, when the intersection between the installation area E1 and the installation area E2 is at one point, the reception device 1A calculates the point O at the center of the intersection as the installation location of the reception device 1A.

As shown in FIG. 7, when the intersection between the installation area E1 and the installation area E2 is at two points, a line segment L is drawn through centers of the intersection points OA and OB, and the reception device 1A calculates the point O at the center of this line segment L (e.g., the center of a line segment between the centers of the intersection points OA and OB) as the installation location of the reception device 1A.

As shown in FIG. 8, when there is no intersection between the installation area E1 and the installation area E2, a line segment L1 is drawn through the places where the center line of the installation area E1 (e.g., width center line of the band-like installation area E1) and the center line of the installation area E2 (e.g., width center line of the band-like installation area E2) are closest, and the reception device 1A calculates the point O at the center of this line segment L1 (e.g., the center of a line segment between the places on the center lines of the installation areas E1 and E2) as the installation location of the reception device 1A.

As shown in FIG. 9, when the installation location of the reception device 1A is calculated base on three or more installation areas (e.g., installation areas E1, E2 and E3), there can be three or more points of intersection between the installation areas (e.g., installation areas E1, E2 and E3). Here, the reception device 1A estimates the installation area E3 in the same manner as the installation areas E1 and E2 based on the digital broadcast signals from the transmission tower 2A and the transmission tower 2D, for example. If there are three or more points of intersection between the installation area E1, the installation area E2, and the installation area E3, the center O of a polyhedron (e.g., the centroid O of a polygon) that links these points of intersection is calculated as the installation location of the reception device 1A. The reception device 1A can also calculate the point of intersection at which the most installation areas cross.

As discussed above, the reception device 1A can automatically calculate the installation location of the reception device 1A merely by receiving the digital broadcast signals from the transmission towers 2. Therefore, the user does not need to go to the trouble of performing operations such as inputting the installation location of the reception device 1A.

Also, since the reception device 1A can identify the zone in which the reception device 1A is installed, it can select and acquire commercials and so forth corresponding to the zone (such as nearby shop hours or sale information). As a result, pinpoint advertising can be provided (advertising aimed at a specific zone), and this makes the commercials more effective.

The reception device 1 receives the broadcast signals sent from the transmission towers 2. The direction detector 141 detects the reception direction of the broadcast signal received by the receiver 12 for each of three or more transmission towers 2. For example, the direction detector 141 makes use of the smart antenna having a plurality of radial elements connected to the receiver 12, and detects the direction in which the level of the received broadcast signal is highest as the reception direction of the broadcast signal (that is, the direction of the transmission tower 2 transmitting that broadcast signal).

Also, the direction detector 141 (e.g., location information acquisition component) acquires the location information indicating the location where the transmission tower 2 is installed for each transmission tower 2 for which the direction detector 141 has detected the reception direction of the broadcast signal. This location information is superimposed with the broadcast signal transmitted from the transmission tower 2. When the location information is multiplexed with the broadcast signal, the direction detector 141 acquires the location information by decoding or de-multiplexing the broadcast signal. Alternatively, a table associating the location information with each transmission tower can be stored in the memory 13. When this table is used, information identifying the transmission tower 2 can be superimposed with the broadcast signal transmitted from that transmission tower 2.

Also, the location calculator 142 produces two or more combination patterns for two transmission towers 2. The location calculator 142 also estimates the area in which the reception device 1 is located by using the reception direction of the broadcast signal detected by the direction detector 141 and the location information acquired by direction detector 141. Furthermore, the location calculator 142 collectively calculates the location of the reception device 1 from the area in which the reception device 1 is located and that is estimated for each combination pattern. For example, the location calculator 142 estimates the area in which the reception device 1 is located by using the cosine theorem for each combination pattern for two transmission towers 2. The location calculator 142 collectively calculates the location of the reception device 1 according to overlap, etc., in the areas where the reception device 1 is estimated to be located based on each combination pattern for two transmission towers.

Therefore, the place where the reception device 1 is installed can be accurately obtained without causing the user a great deal of trouble.

The reception device 1 allows the place where the reception device 1 is installed to be accurately obtained without causing the user a great deal of trouble.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only a preferred embodiment has been chosen to illustrate the present invention, it will be apparent to those skilled in the art from this disclosure that various changes and modifications can be made herein without departing from the scope of the invention as defined in the appended claims. The functions of one element can be performed by two, and vice versa. Every feature which is unique from the prior art, alone or in combination with other features, also should be considered a separate description of further inventions by the applicant, including the structural and/or functional concepts embodied by such feature. Thus, the foregoing descriptions of the embodiment according to the present invention are provided for illustration only, and not for the purpose of limiting the invention as defined by the appended claims and their equivalents.

What is claimed is:
1. A reception device comprising:
  a receiver configured to receive a plurality of broadcast signals sent from a plurality of transmission towers, respectively;
  a direction detector configured to detect reception directions of the broadcast signals that are received by the receiver;
  a location information acquisition component configured to acquire location information indicating locations where the transmission towers are installed, respectively;

a location calculator configured to select at least three of the transmission towers, estimate at least two estimated areas in which the reception device is located with each of the at least two of the estimated areas being estimated based on the reception directions of the broadcast signals of two of the at least three of the transmission towers and the location information of the two of the at least three of the transmission towers, and calculate a location of the reception device based on the at least two of the estimated areas;

a memory configured to store a zone table indicative of positions of zones; and a zone determiner configured to determine a zone of the reception device based on the zone table and the location of the reception device that is calculated by the location calculator.

2. The reception device according to claim 1, wherein the receiver is connected to a smart antenna having a plurality of radial elements.

3. The reception device according to claim 2, wherein the location information acquisition component is further configured to acquire the location information that is multiplexed with the broadcast signals.

4. The reception device according to claim 3, wherein the location calculator is further configured to calculate each of the at least two of the estimated areas of the reception device based on an angle that is formed by the reception directions of the broadcast signals of the two of the at least three of the transmission towers, and the location information of the two of the at least three of the transmission towers.

5. The reception device according to claim 1, wherein the location calculator is further configured to calculate an overlap of the at least two of the estimated areas, and calculate the location of the reception device based on the overlap of the at least two of the estimated areas.

6. The reception device according to claim 1, further comprising a processor configured to acquire video signal and audio signal corresponding to the zone of the reception device from the broadcast signals.

7. The reception device according to claim 6, wherein the receiver is connected to a smart antenna having a plurality of radial elements.

8. The reception device according to claim 7, wherein the location information acquisition component is further configured to acquire the location information that is multiplexed with the broadcast signals.

9. The reception device according to claim 8, wherein the location calculator is further configured to calculate each of the at least two of the estimated areas of the reception device based on an angle that is formed by the reception directions of the broadcast signals of the two of the at least three of the transmission towers, and the location information of the two of the at least three of the transmission towers.

10. The reception device according to claim 9, wherein the location calculator is further configured to calculate an overlap of the at least two of the estimated areas, and calculate the location of the reception device based on the overlap of the at least two of the estimated areas.

11. The reception device according to claim 1, wherein the location information acquisition component is further configured to acquire the location information that is multiplexed with the broadcast signals.

12. The reception device according to claim 1, wherein the location calculator is further configured to calculate each of the at least two of the estimated areas of the reception device based on an angle that is formed by the reception directions of the broadcast signals of the two of the at least three of the transmission towers, and the location information of the two of the at least three of the transmission towers.

13. A reception device comprising:

a receiver configured to receive a plurality of broadcast signals sent from a plurality of transmission towers, respectively;

a direction detector configured to detect reception directions of the broadcast signals that are received by the receiver;

a location information acquisition component configured to acquire location information indicating locations where the transmission towers are installed, respectively;

a location calculator configured to select at least three of the transmission towers, estimate at least two estimated areas in which the reception device is located with each of the at least two of the estimated areas being estimated based on the reception directions of the broadcast signals of two of the at least three of the transmission towers and the location information of the two of the at least three of the transmission towers, and calculate a location of the reception device based on the at least two of the estimated areas;

a memory configured to store a zone table indicative of positions of zones; and a zone determiner configured to determine a zone of the reception device based on the zone table and the location of the reception device that is calculated by the location calculator, the receiver being connected to a smart antenna having a plurality of radial elements, the location information acquisition component being further configured to acquire the location information that is multiplexed with the broadcast signals, the location calculator being further configured to calculate each of the at least two of the estimated areas of the reception device based on an angle that is formed by the reception directions of the broadcast signals of the two of the at least three of the transmission towers, and the location information of the two of the at least three of the transmission towers, and the location calculator being further configured to calculate an overlap of the at least two of the estimated areas, and calculate the location of the reception device based on the overlap of the at least two of the estimated areas.

* * * * *